(12) United States Patent
Parks, Jr.

(10) Patent No.: US 8,327,866 B2
(45) Date of Patent: Dec. 11, 2012

(54) GATE VALVE SEAT

(75) Inventor: Glenn C. Parks, Jr., Cypress, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 225 days.

(21) Appl. No.: 12/855,527

(22) Filed: Aug. 12, 2010

(65) Prior Publication Data

US 2011/0037010 A1    Feb. 17, 2011

Related U.S. Application Data

(60) Provisional application No. 61/274,009, filed on Aug. 12, 2009.

(51) Int. Cl.
*F16K 3/00* (2006.01)

(52) U.S. Cl. ............ 137/15.23; 251/174; 251/195; 251/328

(58) Field of Classification Search ............ 251/174, 251/195, 326–329; 137/15.23
See application file for complete search history.

(56) References Cited

U.S. PATENT DOCUMENTS

| | | | | |
|---|---|---|---|---|
| 3,114,386 A | * | 12/1963 | Dumm | 137/316 |
| 3,353,784 A | * | 11/1967 | Grove | 251/174 |
| 4,240,460 A | * | 12/1980 | Alaniz | 137/327 |
| 4,246,928 A | * | 1/1981 | Burns et al. | 137/315.32 |
| 4,313,458 A | * | 2/1982 | Burns et al. | 137/327 |
| 4,364,544 A | * | 12/1982 | Kim | 251/328 |
| 4,434,967 A | | 3/1984 | Vanderburg | |
| 4,513,947 A | | 4/1985 | Amend | |
| 4,759,529 A | | 7/1988 | Berger et al. | |
| 5,029,812 A | | 7/1991 | Haynes | |
| 5,163,655 A | * | 11/1992 | Chickering et al. | 251/174 |
| 5,370,362 A | | 12/1994 | Kent et al. | |
| 5,501,424 A | | 3/1996 | Williams et al. | |
| 5,577,707 A | | 11/1996 | Brida | |
| 5,727,775 A | | 3/1998 | Roger et al. | |
| 5,762,320 A | | 6/1998 | Williams et al. | |
| 6,664,572 B2 | | 12/2003 | Chatufale | |
| 6,918,574 B2 | | 7/2005 | Hallden et al. | |
| 7,004,452 B2 | | 2/2006 | Chatufale | |
| 7,255,328 B2 | | 8/2007 | Hunter et al. | |
| 2003/0038266 A1 | | 2/2003 | Hallden et al. | |
| 2006/0038155 A1 | | 2/2006 | Lam | |
| 2008/0217569 A1 | | 9/2008 | Holliday | |

FOREIGN PATENT DOCUMENTS

GB    2272271    5/1994

OTHER PUBLICATIONS

International Search Report for PCT application PCT/US2010/045353.

* cited by examiner

*Primary Examiner* — John Bastianelli

(74) *Attorney, Agent, or Firm* — Bracewell & Giuliani LLP (57) ABSTRACT

A gate valve seat for a gate valve includes a seat having a stepped outer wall surface, with a spring, spacer ring, front facing lip seal, and a rear facing lip seal disposed about the stepped outer surface of the seat. The spring may be releasably locked into a compressed configuration for installation of the gate of the gate valve.

13 Claims, 12 Drawing Sheets

GATE VALVE SEAT

RELATED APPLICATION

This application claims the benefit, and priority benefit, of U.S. Patent Application Ser. No. 61/274,009, filed Aug. 12, 2009, entitled "GATE VALVE SEAT".

BACKGROUND

1. Field of the Disclosure

The disclosure relates to seats for gate valves, and in particular for gate valves for use with oil and other fluids.

2. Background of the Invention

Gate valves are used to control fluid flow through a pipe or other conduit, and include a gate, or subgate, that may be reciprocated between a sealed relationship within the gate valve, blocking flow of the fluid through the pipe and gate valve, to an open position within the gate valve to permit flow of the fluid through the pipe and the gate valve. The gate of the gate valve engages and seals against gate valve seats disposed on both sides of the gate.

BRIEF SUMMARY

In accordance with the illustrative embodiments hereinafter described, the present gate valve seat for use in a gate valve having a gate and a gate valve body, may include: a seat having a stepped outer wall surface; an annular shaped spring; an annular shaped spacer ring; an annular shaped front facing lip seal adapted for sealing against a portion of the gate valve body; an annular shaped rear facing lip seal, which seals against a first portion of the stepped outer wall surface of the seat; the spring, spacer ring, front facing lip seal, and rear facing lip seal may be disposed about the stepped outer wall surface of the seat, with the spring being disposed in a compressed configuration between a second portion of the stepped outer wall surface of the seat and the spacer ring, whereby the spring may bias the seat toward the gate of the gate valve.

BRIEF DESCRIPTION OF THE DRAWING

The present gate valve seat may be understood by reference to the following description taken in conjunction with the accompanying drawing, in which.

While certain embodiments of the present gate valve seat will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the appended claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION OF THE SPECIFIC EMBODIMENTS

Figure 1:
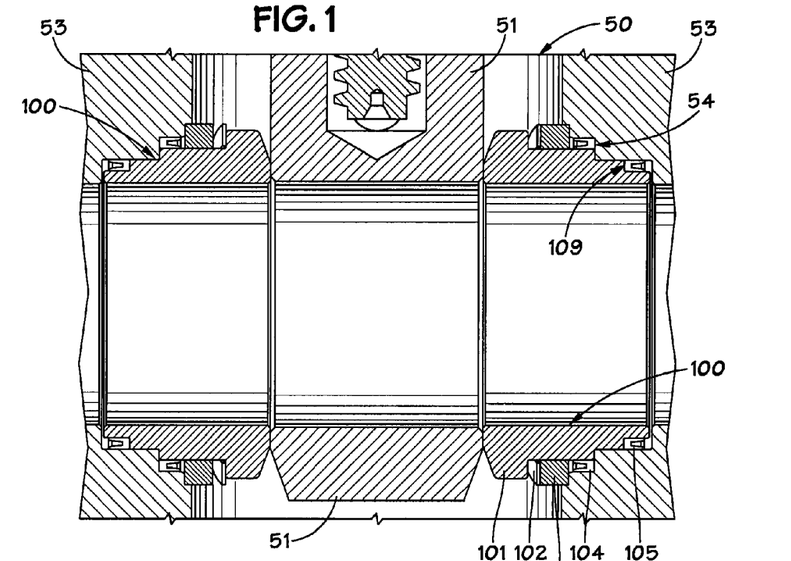
FIG. 1 is a partial cross-sectional view of a gate valve in an open position including an illustrative embodiment of the present gate valve seat.
Figure 2:
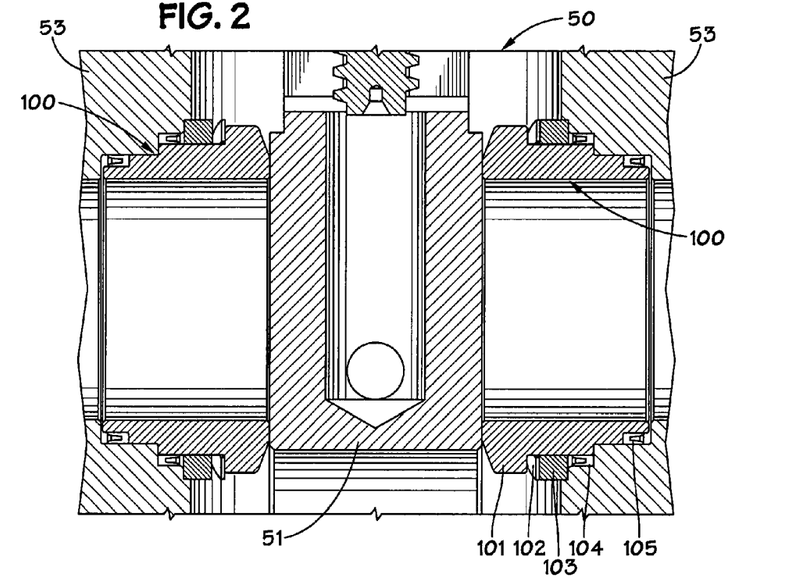
FIG. 2 is a partial cross-sectional view of the gate valve of FIG. 1, with the gate in its closed position.

With reference to FIGS. 1 and 2, a conventional gate valve 50 having a gate, or slab gate, 51 disposed within a gate valve body 53 is illustrated, and gate valve 50 is disposed between two sections of pipe (not shown) in a conventional manner. In FIG. 1, the gate 51 is disposed in its open, fluid transmitting relationship within gate valve 50, and in FIG. 2 the gate 51 is shown in its closed position, wherein gate 51 has been reciprocated downwardly to block flow through the gate valve 50. Disposed upon either side of the gate 51 is an illustrative embodiment of a gate valve seat 100. The gate valve seats 100 abut gate 51 and engage therewith to seal against each side of the gate 51.

With reference to FIGS. 3-7, the illustrative embodiment of gate valve seat 100 will be described in further detail. Gate valve seat 100 generally includes: a seat 101; a spring, or wave spring, or spring member, 102; a spacer ring 103; a front facing lip seal 104; and a rear facing lip seal 105. When gate valve seat 100 is installed in gate valve 50, the wave spring 102 disposed between the seat 101 and the spacer ring 103, is disposed in its compressed configuration and thus exerts a force upon the seat 101 to bias it, or press it, against the gate, or valve gate, 51 as seen in FIGS. 1 and 2, as well as exerts a force upon the spacer ring 103 to bias, or force it, against the gate valve body 53. The front facing lip seal 104 seals against the gate valve body 53 as at surface 54, or the annular groove formed in gate valve body 53, as shown in FIGS. 1 and 2. Rear facing lip seal 105 seals against a stepped wall surface 109 of seat 101. The terms front and rear with respect to facing lip seals 104 and 105 are used in the context of referring to the front of the seat 101, which seats against the gate 51 and the rear of the seat 101 which is disposed further away from the gate 51.

Figure 3:
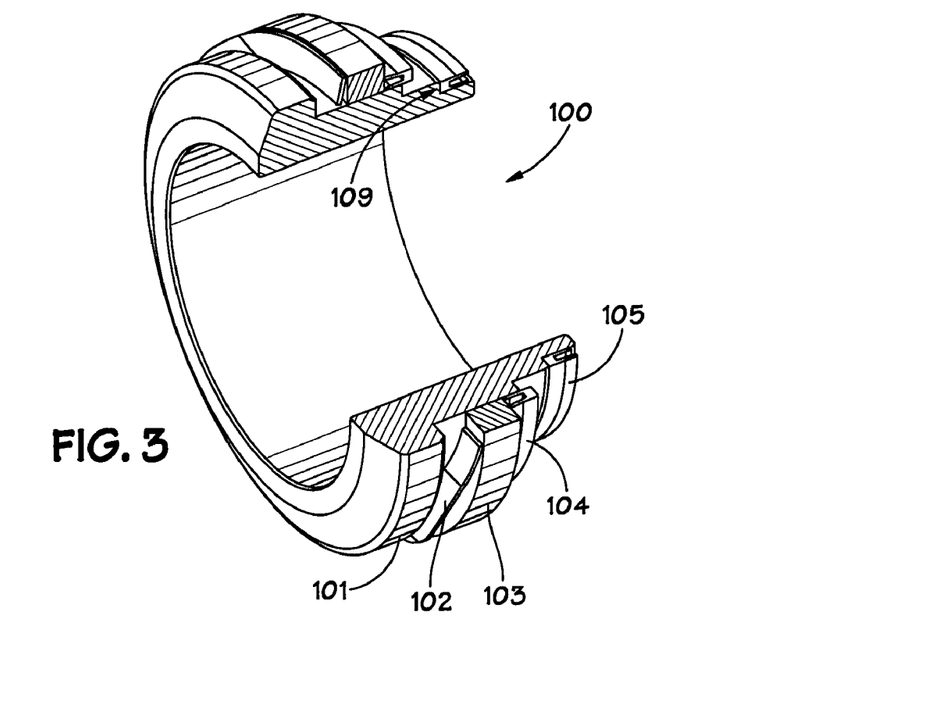
FIG. 3 is perspective, partial cross-sectional view of an illustrative embodiment of the present gate valve seat of FIG. 1.
Figure 4:
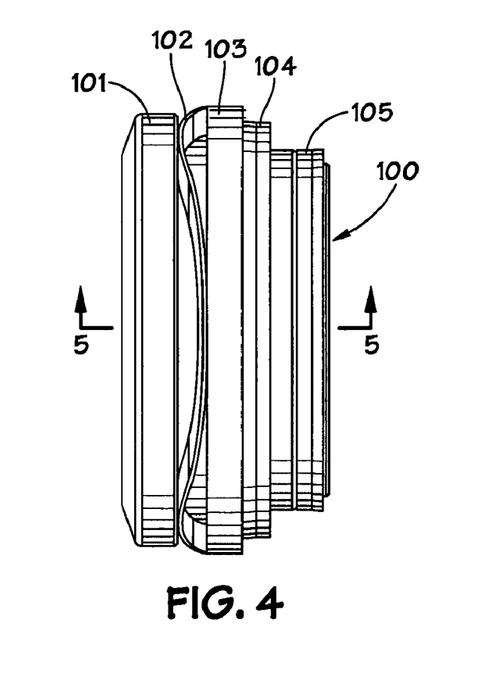
FIG. 4 is a side view of the gate valve seat of FIG. 3.
Figure 5:
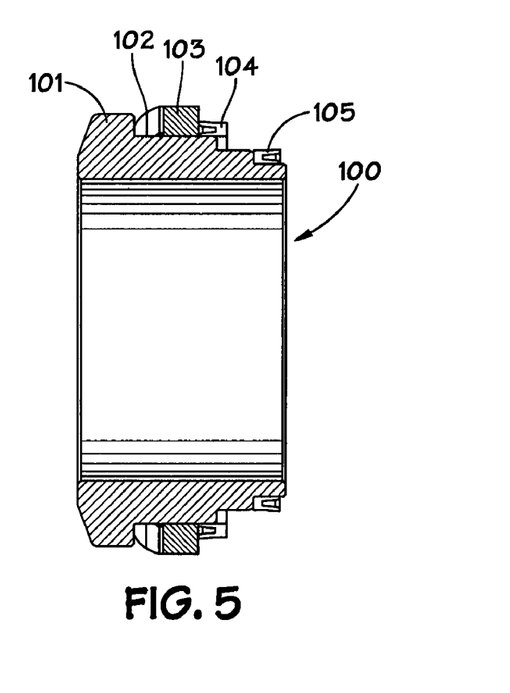
FIG. 5 is a partial cross-sectional view of the gate valve seat of FIG. 4, taken along line 5-5 of FIG. 4.
Figure 6:
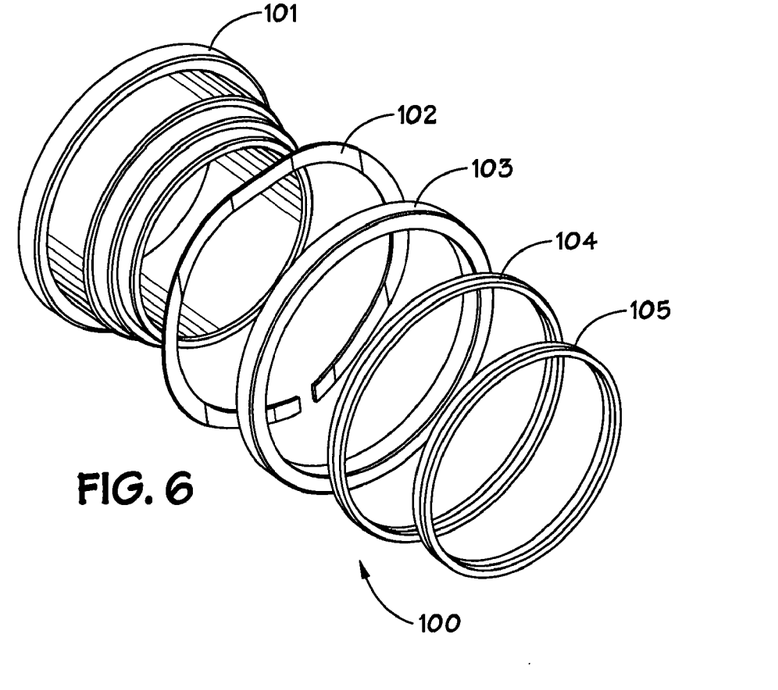
FIG. 6 is perspective, exploded view of the gate valve seat of FIGS. 1-5, looking from the rear of the gate valve seat.
Figure 7:
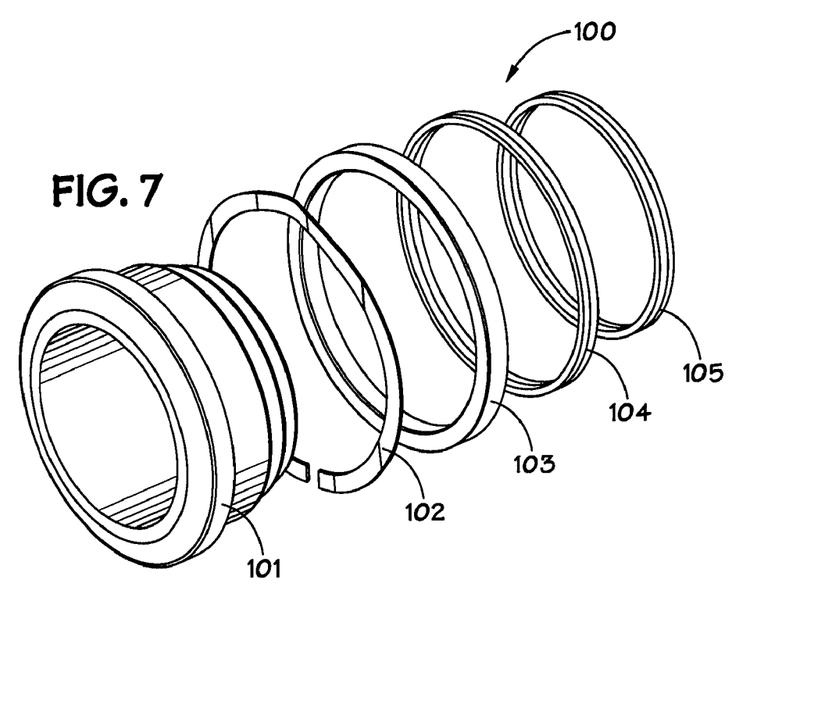
FIG. 7 is a perspective, exploded view of the gate valve seat of FIGS. 1-5, when viewed from the front of the gate valve seat.

Still with reference to FIGS. 3-7, seat 101 is a generally elongate tubular member having a stepped outer wall surface, formed by a plurality of concentric circumferential outer wall surfaces having different diameters such as 131 (FIG. 22) and 109 ((FIG. 3). Spring member 102, spacer ring 103, front facing seal 104, and rear facing seal 105 are generally concentric annular shaped members and are sized to be disposed about seat 100 along the stepped outer wall surface of seat 100.

Figure 8:
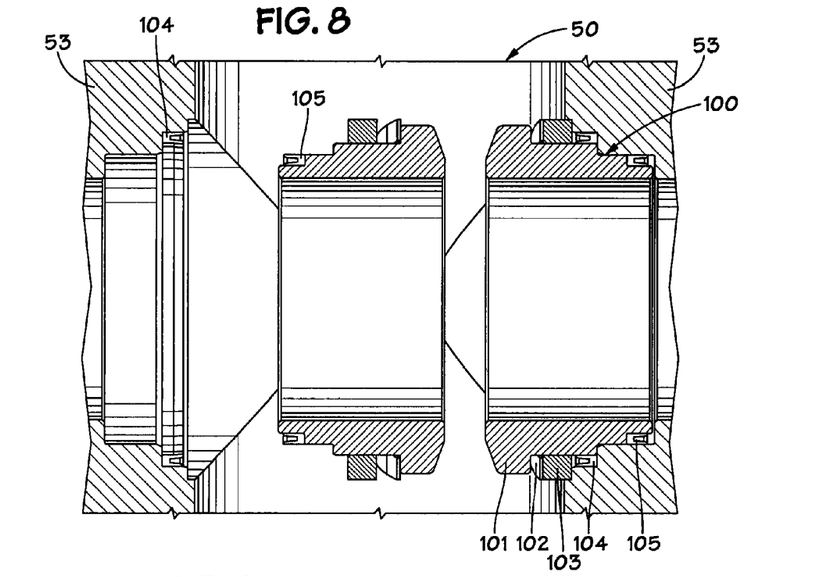
FIG. 8 is a partial cross-sectional view of a gate valve, illustrating the installation of the gate valve seats, wherein the gate valve seat of FIGS. 1-7 is utilized.
Figure 9:
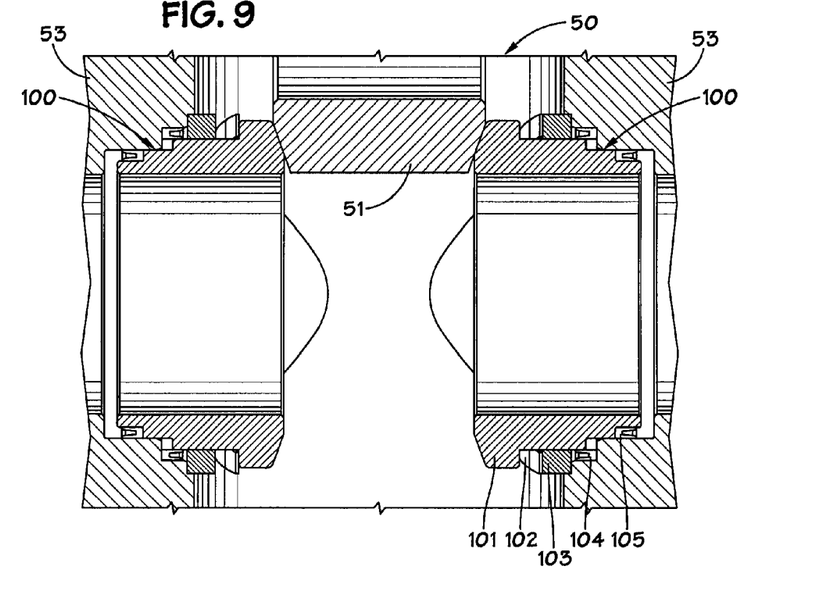
FIG. 9 is a partial cross-sectional view of the gate valve of FIG. 8 illustrating the installation of the gate within the gate valve, wherein the gate valve seat of FIGS. 1-7 is utilized.

With reference to FIGS. 8 and 9, the gate valve seat 100 on the right side of FIG. 8 is shown in its installed configuration. The gate seat valve 100 on the left side of FIG. 8 is illustrated being installed within gate valve 50 in the following manner. The front facing lip seal 104 is first installed, or inserted within gate valve body 53 as shown in the left side of FIG. 8. The other components of gate valve seat 100, or seat 101, wave spring 102, spacer ring 103, and rear facing lip seal 105 are assembled as shown in the left side of FIG. 8, wherein the wave spring 102 is disposed about the seat 101 in its expanded, uncompressed configuration. Those components are then press fitted and received within gate valve body 53 into the configuration shown for gate valve seat 100 on the right side of FIG. 8, wherein wave spring 102 is in compressed configuration.

Thereafter, the gate, or valve gate 51, is moved between the gate valve seats 100 and is moved downwardly within gate valve body 53. As gate 51 moves downwardly, seats 101 move away from the gate to allow the gate to move downwardly; however, the wave spring 102 of each gate valve seat 101 is in a second compressed configuration and exerts a force upon each seat 101 to bias the seats 101 into engagement with the gate 51 as shown in FIGS. 1 and 2.

When gate valve 50 is in its fully open position, as shown in FIG. 1, each of the two seats 101 is pressed against the valve gate 51 by the biasing force of the wave springs 102 and the internal flow pressure, of the fluid (not shown) passing through gate valve 50, acting across the unbalanced area of the set members 101. When gate valve 50 is in the closed position, as shown in FIG. 2, and assuming fluid flow is in a direction from right to left when viewing FIG. 2 whereby the right side of the valve gate 51 is upstream and the left side of the valve gate is downstream, the seat 101 to the right of the valve gate 51 provides upstream sealing against the valve gate 51, and the seat 101 to the left of the valve gate provides downstream sealing. In this regard a gate valve 50, with the present seats 100, 100' and 100" to be hereinafter described can provide primary upstream sealing capability in both directions of flow through gate valve 50, as well as secondary downstream sealing, although the seat to gate contact loading resulting from the internal valve pressure is different for the upstream and the downstream seats when the valve gate is closed.

With seats 100, 100' and 100", a sudden increase in internal valve body cavity pressure will likely automatically vent to the upstream cavity bore, as by unseating the upstream seat 100 to vent the internal pressure, as for example in the event of fire if the valve 50 has a liquid fluid in the valve body cavity.

Figure 10:
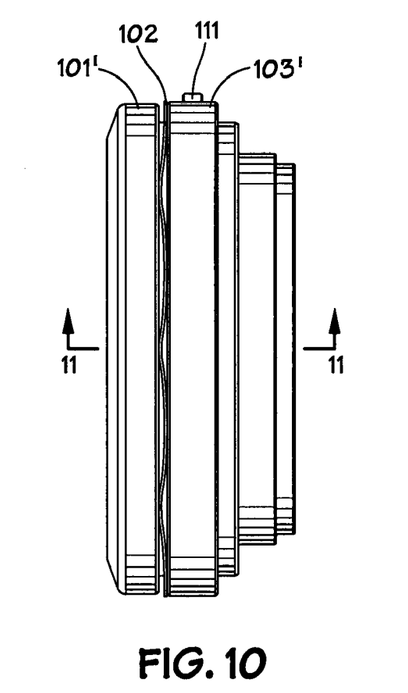
FIG. 10 is a side view of another illustrative embodiment of the present gate valve seat.
Figure 11:
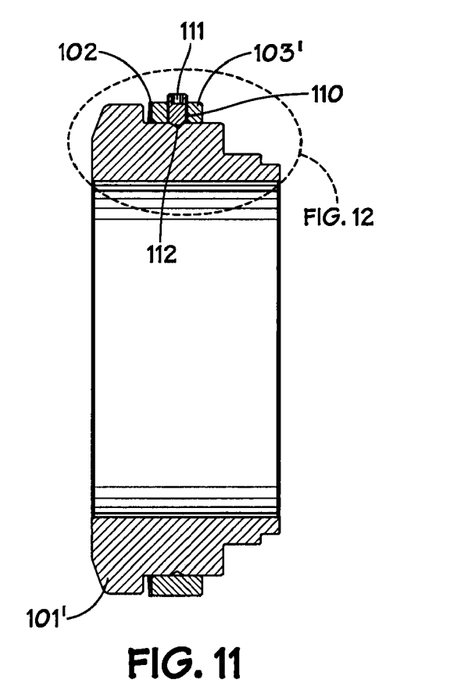
FIG. 11 is a partial cross-sectional view of the gate valve seat of FIG. 10, taken along line 11-11 of FIG. 10.
Figure 12:
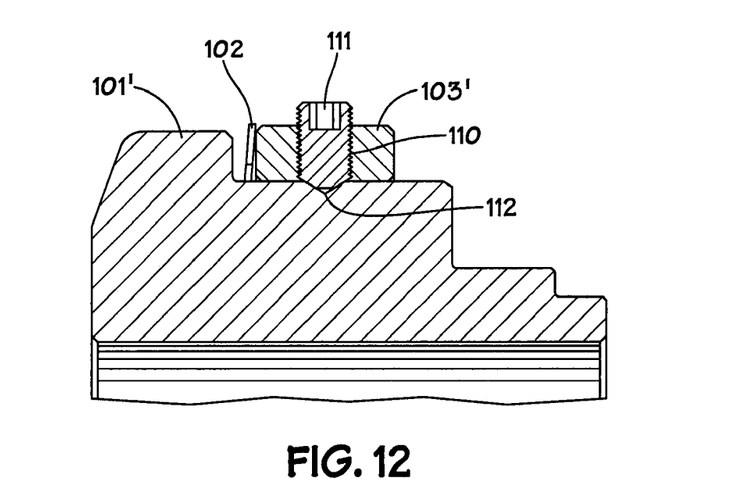
FIG. 12 is an enlarged view of a portion of the gate valve seat of FIG. 11 denoted by the dotted lines oval designated "FIG. 12" in FIG. 11.
Figure 13:
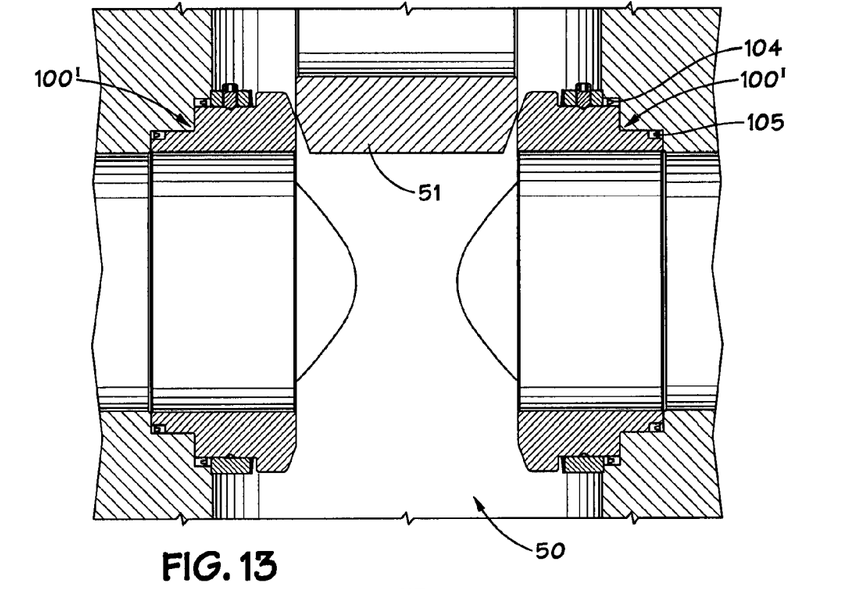
FIG. 13 is a partial cross-sectional view of a gate valve provided with the gate valve seats of FIGS. 10-12 and illustrating the installation of the gate within the gate valve.

With reference to FIGS. 10-14, another illustrative embodiment of the present gate valve seat 100' is illustrated. Gate valve seat 100' generally includes: a seat 101', wave spring 102, spacer ring 103', front facing lip seal 104 (FIG. 13), and rear facing lip seal 105 (FIG. 13). In gate valve seat 100' the valve seat 101' and the spacer ring 103' have been modified to have a releasable locking member or releasable locking mechanism associated with it to allow the wave spring 102 to be first compressed and retained in a first compressed condition, or configuration, prior to its installation into gate valve 50. Spacer ring 103' differs from spacer ring 103 of gate valve seal 100, in that a threaded opening 110 is formed in spacer ring 103', which threaded opening 110 receives a releasable locking member, or threaded set screw 111. Circumferential seat 101' has been modified to have a shallow groove 112 formed in one of its stepped outer wall surfaces. Gate valve seat 100' is then assembled and installed in the following manner. Wave spring 102 is disposed upon seat 101', followed by spacer ring 103'. Wave spring 102 is compressed, as by providing relative movement between seat 101' and spacer ring 103' to compress wave spring 102 into its first compressed state, or compressed configuration, at which time set screw 111 is screwed downwardly through threaded opening 110 until it engages groove 112 and retains spacer ring 103' in the configuration illustrated in FIGS. 10-12. Rear facing lip seal 105 is then disposed about seat 101'. Front facing lip seal 104 is installed into the gate valve body 53 as previously described in connection with the installation of gate valve seat 100 of FIGS. 1-9. Seat 101', wave spring 102, spacer ring 103' and rear facing lip seal 105 are then inserted into gate valve body 53, while wave spring 102 is in its compressed configuration as illustrated in FIGS. 10-12. Each gate valve seat 100' is thus installed into gate valve body 53 as illustrated in FIG. 13.

Figure 14:
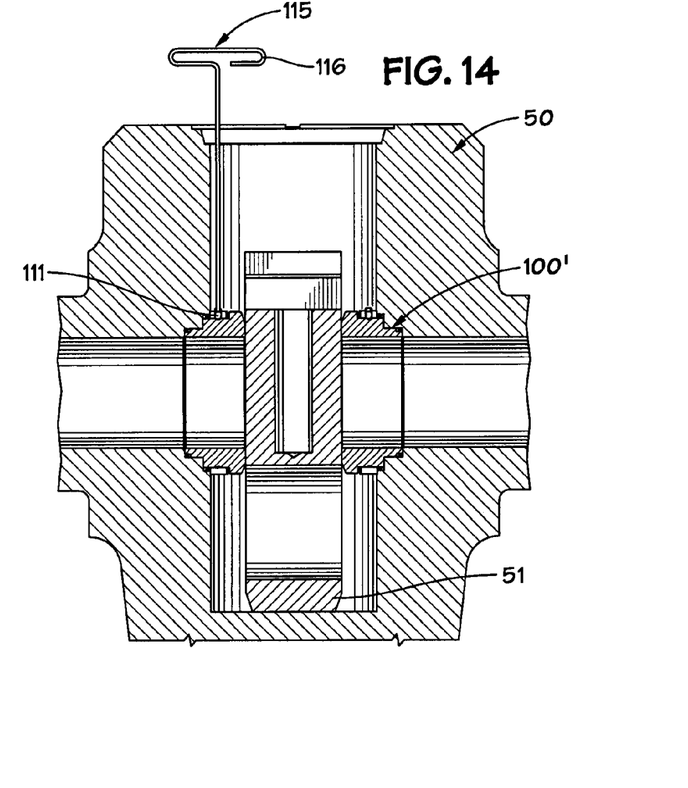
FIG. 14 is a partial cross-sectional view of the gate valve of FIG. 13, in its closed position.
Figure 15:
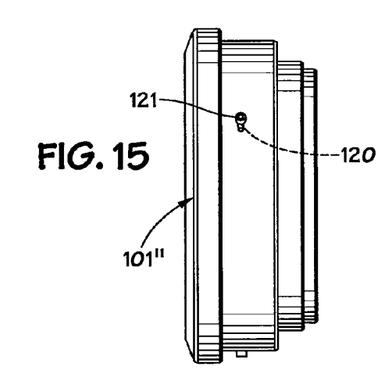
FIG. 15 is a side view of another illustrative embodiment of the present gate valve seat.
Figure 16:
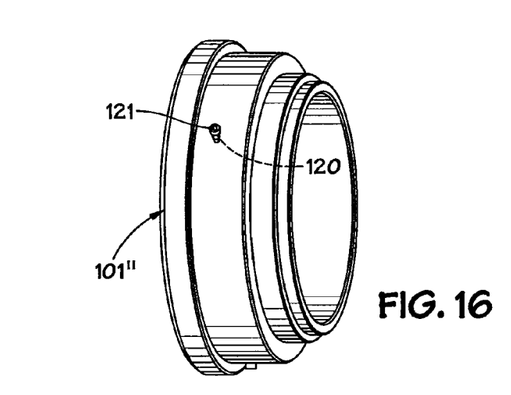
FIG. 16 is a perspective view of the gate valve seat of FIG. 15.
Figure 17:
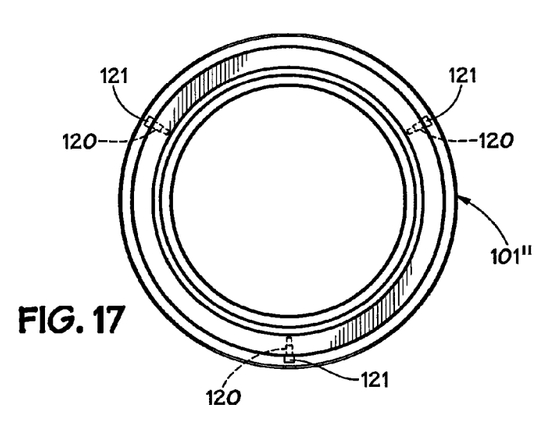
FIG. 17 is a front view of the gate valve seat of FIGS. 15 and 16.
Figure 18:
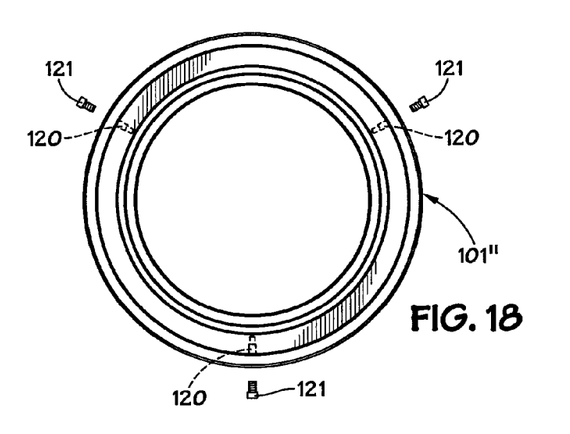
FIG. 18 is a rear view of the gate valve seat of FIGS. 15 and 16.

As shown in FIGS. 13 and 14, the gate 51 is then installed as by lowering it from its open configuration of FIG. 13, downwardly into the gate valve body 53, until the gate 51 is in its closed configuration as illustrated in FIG. 14. Once the gate 51 has been fully installed, a suitable tool 115, is used to release the releasable locking member, such as an elongated hex key 116 is inserted into the gate valve body 53 into engagement with the releasable locking member, or threaded set screw 111. Set screw 111 is removed, retracted, or released, which allows the spring member 102 to expand from its first compressed configuration into a second compressed configuration which in turn forces, or biases, the spacer ring 103' against the gate valve body 53, as well as forces, or biases, the seat 101' against the gate 51 of gate valve 50, as shown in FIG. 14.

With reference to FIGS. 15-28, another illustrative embodiment of the present gate valve seat 100" is illustrated. The seat 101" of gate valve seat 100" has the same general configuration as the other seats 101 and 101', including having substantially the same stepped outer wall configuration, with the exception that a different releasable locking mechanism for the spacer ring is utilized. At least two, and preferably three drilled and tapped holes 120 are substantially, equidistantly spaced about the outer circumference of the seat 101" or about one of the stepped outer wall surfaces of seat 101", as shown in FIGS. 15-18, and the drilled and tapped holes 120 are adapted to each receive an alignment member, such as a socket head cap screw, or alignment screw, 121, as shown in FIGS. 15-18.

Figure 19:
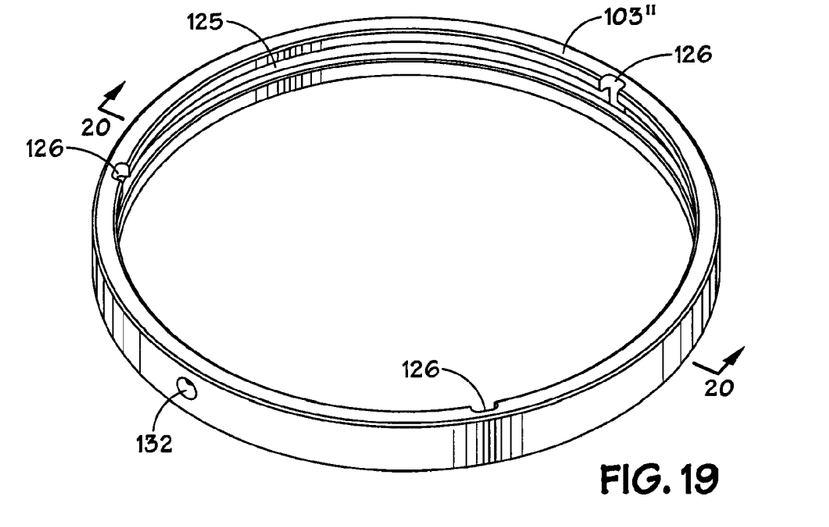
FIG. 19 is a perspective view of a spacer ring for use with the gate valve seat of FIGS. 15 and 16.
Figure 20:
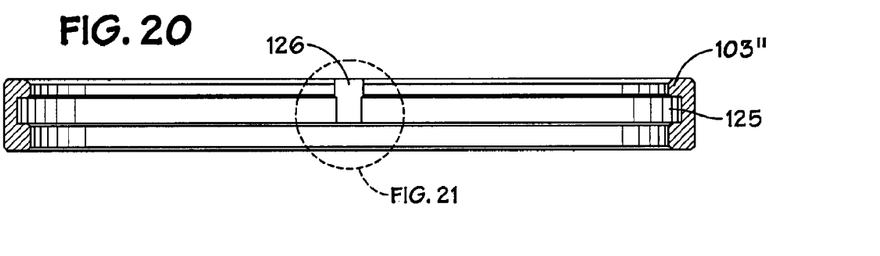
FIG. 20 is a partial cross-sectional view of spacer ring of FIG. 19, taken along line 20-20 of FIG. 19.
Figure 21:
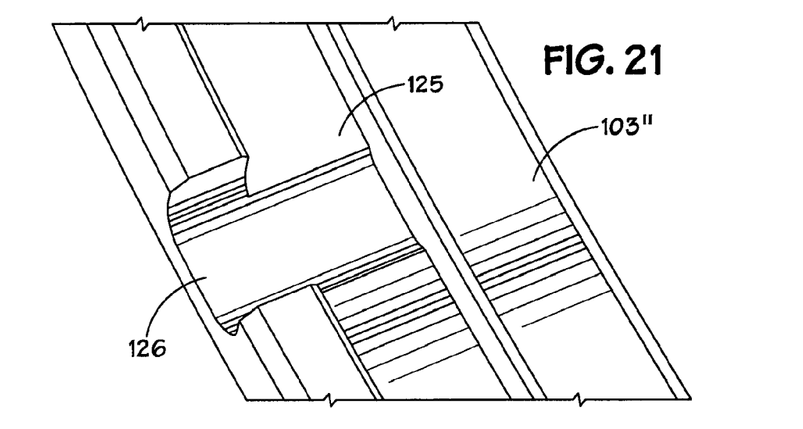
FIG. 21 is an enlarged view of a portion of the spacer ring of FIG. 20, denoted by dotted lines 21.

With reference to FIGS. 19-21, spacer ring 103" is provided with an internal, circumferential groove 125. At least two, and preferably, three alignment member access openings, or openings 126 are substantially equidistantly spaced about spacer ring 103", as by machining them into the spacer ring 103" from one side of the spacer ring 103' into communication with the circumferential groove 125 as shown in FIGS. 19-21. The openings 126 are sized to permit an alignment member or a cap screw, or alignment screw, 121 to be accepted therein. As will be hereinafter described, the circumferential groove 125 in spacer ring 103" is sized to permit the spacer ring 103" to freely rotate about the seat 101" and the alignment member, or cap screws, 121. The three openings 126 allow the alignment member, or seat alignment screws, 121 to pass through openings 126 into the internal circumferential groove 125 of spacer ring 103". Subsequent rotation of the spacer ring 103" releasably locks the spacer ring 103 in the desired position upon seat 101", as will be hereinafter discussed.

Figure 22:
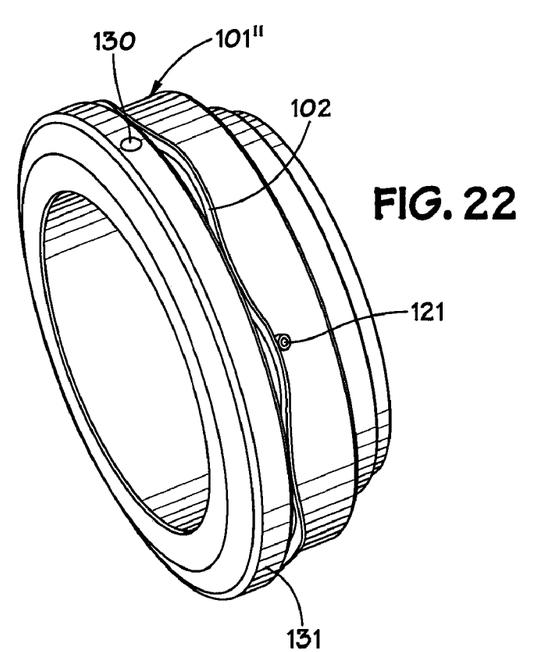
FIG. 22 is a perspective view of the gate valve seat of FIGS. 15 and 16 during assembly of the gate valve seat.
Figure 23:
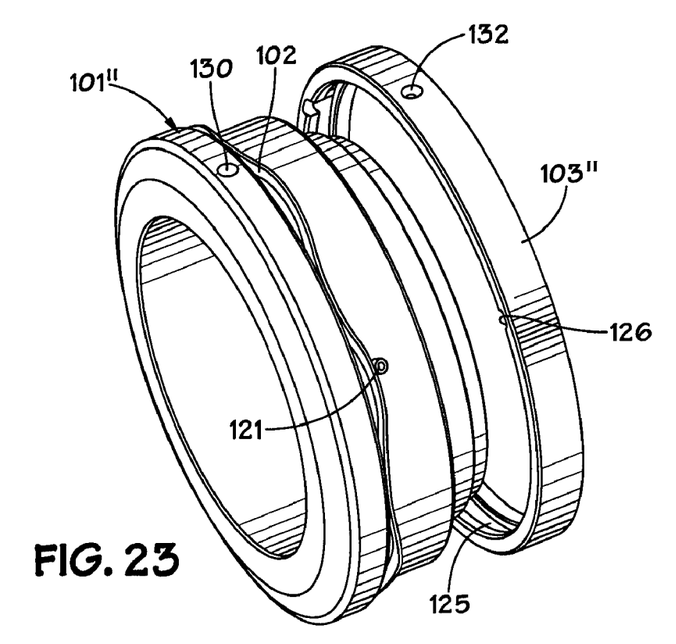
FIG. 23 is a perspective view of the gate valve seat of FIGS. 15 and 16, illustrating the assembly of the gate valve seat.
Figure 24:
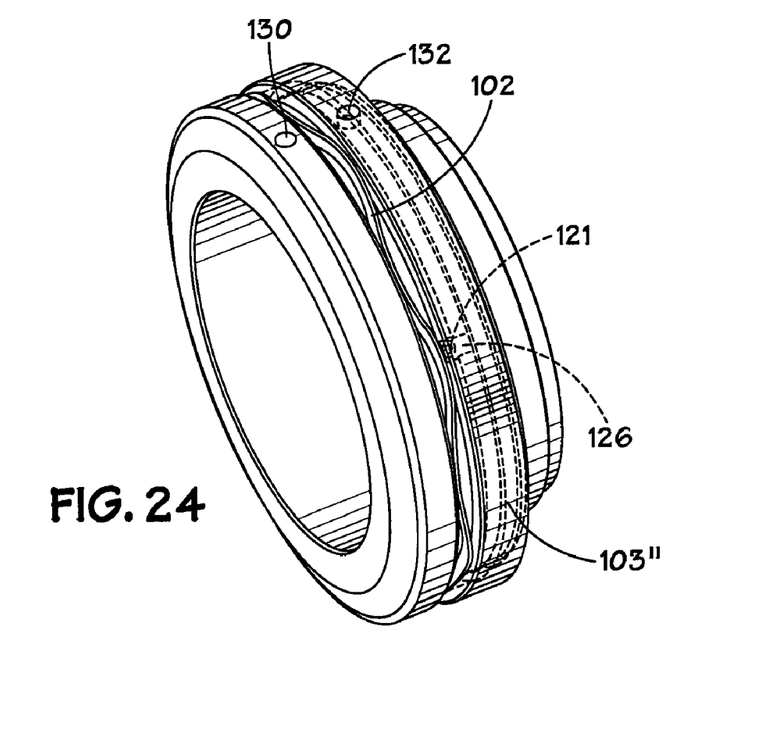
FIG. 24 is a perspective view of the gate valve seat of FIGS. 15 and 16 during assembly.
Figure 25:
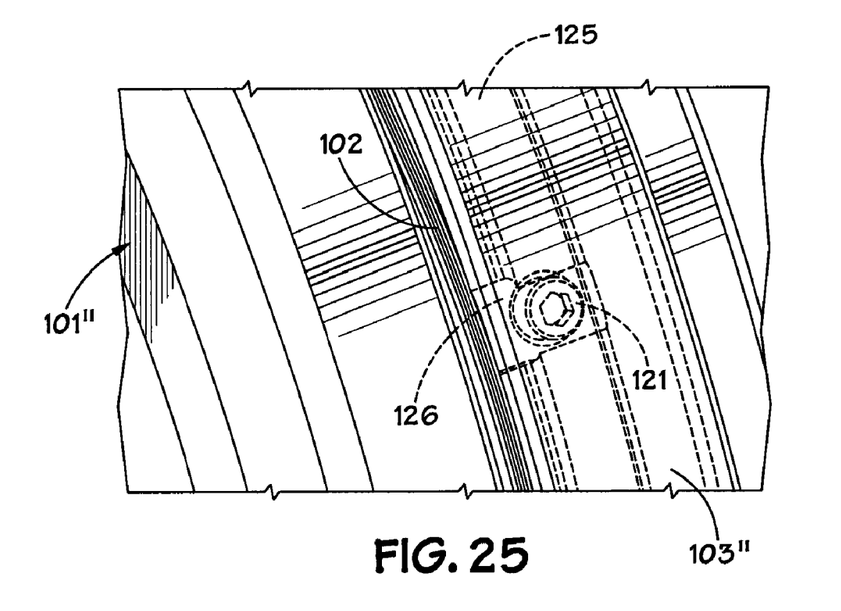
FIG. 25 is an enlarged view of a portion of the gate valve seat of FIG. 24 during assembly of the gate valve seat of FIGS. 15 and 16.

With reference to FIGS. 22-28, the assembly and installation of gate valve seat 101" will be described. With reference to FIG. 22, seat 101" has a wave spring, or spring member, 102 placed upon seat member 101". The three alignment screws 121 are then threaded into the openings 120 of seat 101", as shown in FIG. 22. With reference to FIG. 23, the openings 126 in spacer ring 103" are aligned with the alignment screws 121, and the spacer ring 103" is placed upon seat 101" as shown in FIG. 24, wherein wave spring is in its relaxed, expanded configuration. As the spacer ring 103" is moved forward onto the seat 101", wave spring, or spring member, 102 is compressed into a first compressed configuration, as shown in FIG. 25, and spacer ring 103" is moved until alignment screws 121 are disposed within the circumferential groove 125, also as shown in FIG. 25.

With reference to FIGS. 22 and 23, it is seen that seat 101" has a hole formed in it, such as opening 130 formed in the leading circumferential outer wall surface, or stepped outer wall surface, 131 of seat 101". Similarly, spacer ring 103" has an opening 132 formed in it as shown in FIGS. 19 and 23. As seen in FIGS. 23 and 24, when spacer ring 103" is initially aligned with seat 101" with openings 126 aligned with alignment screws 121, opening 132 in spacer ring 103" is aligned with opening 130 of seat 101", as shown in FIGS. 23-24.

Figure 26:
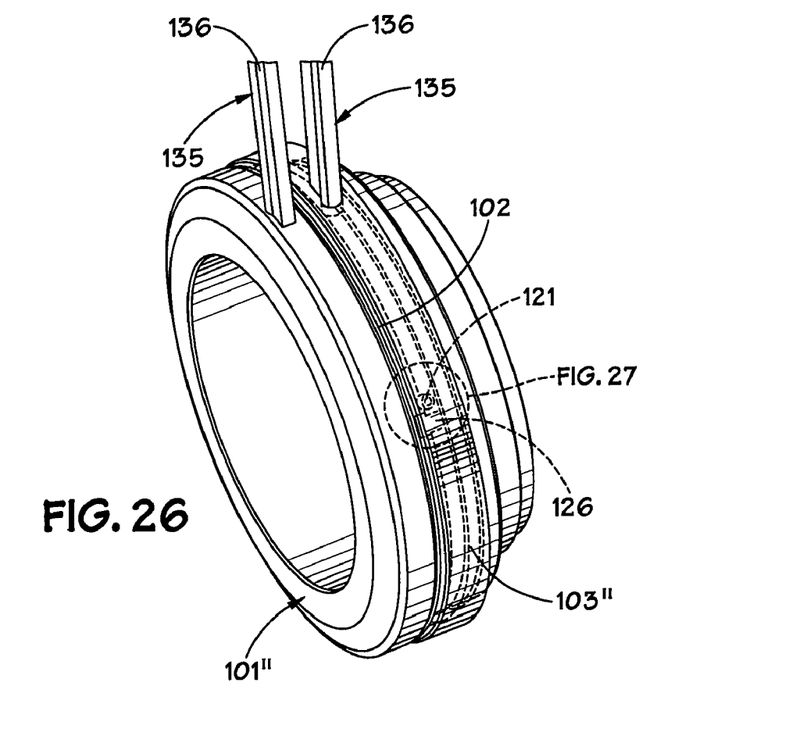
FIG. 26 is a perspective view of the gate valve seat of FIGS. 15 and 16 during assembly of the gate valve seat.
Figure 27:
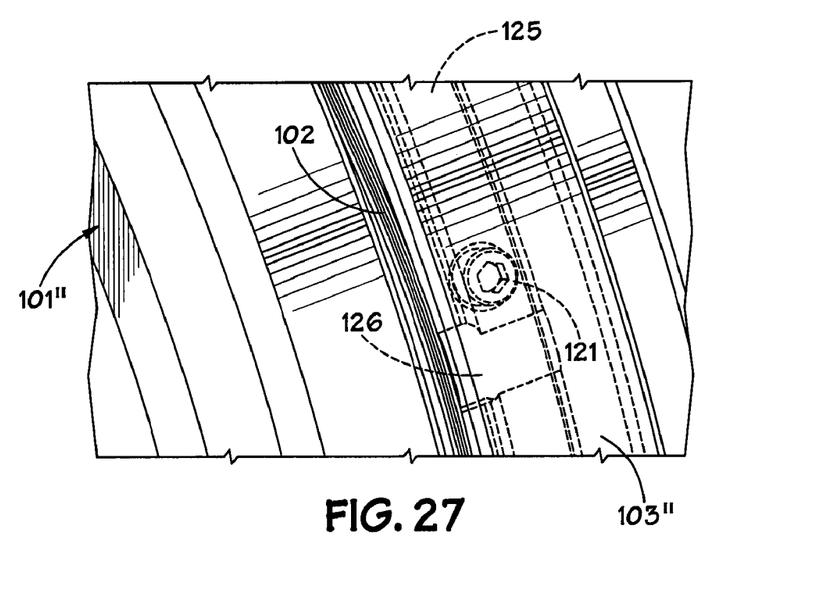
FIG. 27 is an enlarged view of a portion of the gate valve seat of FIG. 26, denoted by dotted lines 27 during assembly of the gate valve seat of FIGS. 15 and 16.

With reference to FIGS. 26 and 27, suitable tools 135, or pin type spanner wrenches 136 may be utilized to rotate spacer ring 103" with respect to seat 101" to move the position of the alignment screws 121 away from the openings 126 of spacer ring 103' as shown in FIG. 27. Preferably, the tools 135 are utilized to rotate the spacer ring 103" approximately 5 degrees as shown in FIG. 27. The alignment screws 121 are thus completely disposed within the circumferential groove 125 of spacer ring 103", and serve to releasably retain or lock spacer ring 103" with respect to seat 101", to maintain the spring member 102 in its first compressed configuration as shown in FIG. 27. Thereafter, the rear facing lip seal 105 is disposed about and upon seat 101", as shown in FIG. 28.

Figure 28:
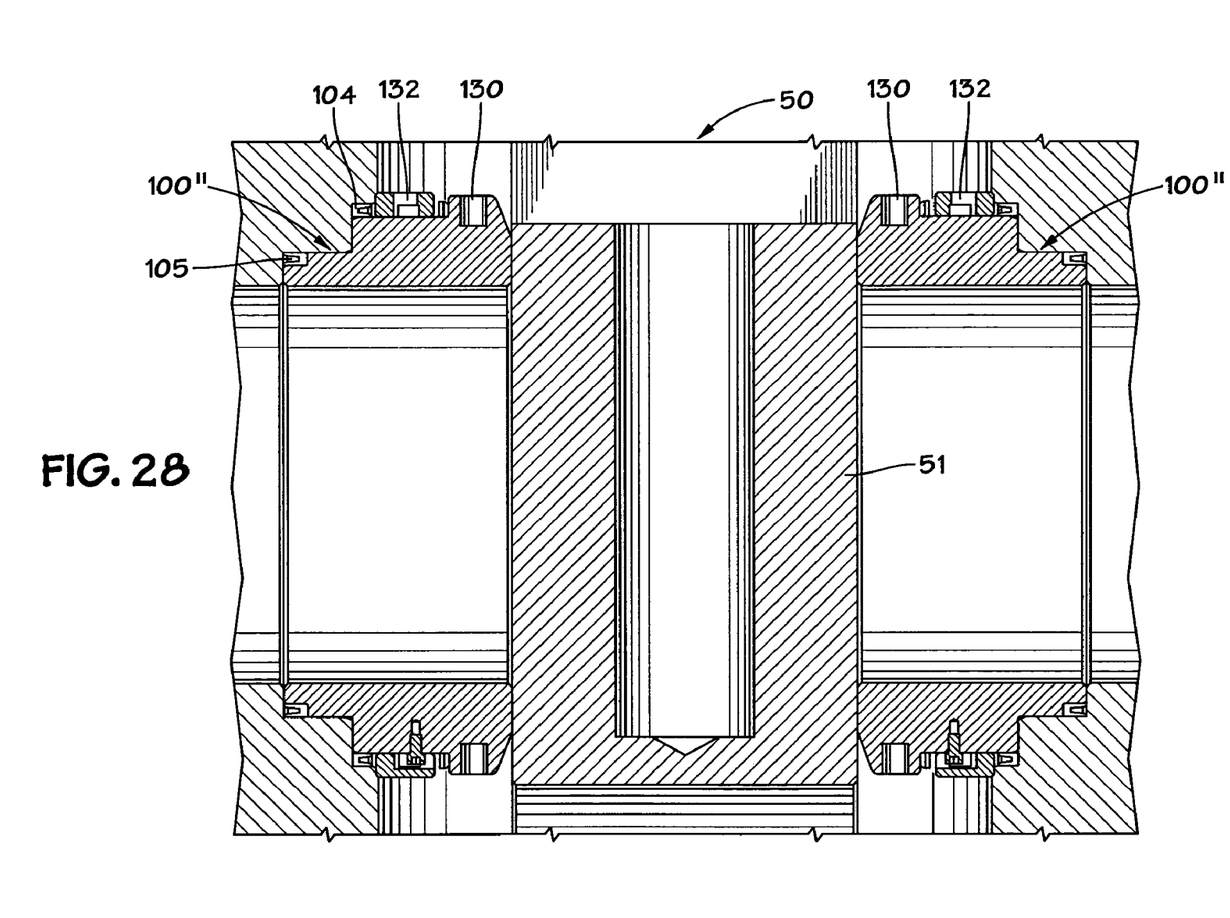
FIG. 28 is a partial cross-sectional view of a gate valve with the gate valve seat of FIGS. 15 and 16, during assembly thereof.

With reference to FIG. 28, the front facing lip seal 104 would then be disposed within gate valve body 53 as previously described in connection with the embodiment of gate valve seats 100 and 101'. The seat 101", spring member 102, spacer ring 103" and rear facing lip seal 105 would then be disposed and installed within gate valve 50 in the same manner previously described in connection with the installation of seat 100' in FIG. 13. The gate 51 of gate valve 50 would then be lowered downwardly between the two gate valve seats 100" until gate 51 is in its closed position as illustrated in FIG. 28. Thereafter, in a similar fashion to that shown in FIG. 14, the tools 135, or pin type spanner wrenches 136, would be lowered into gate valve body 53 into engagement with the openings 130 and 132 of seat 101" and spacer ring 103". Spacer ring 103" would be rotated with respect to seat 101" until the alignment screws 121 are in alignment with openings 126 in spacer ring 103". Upon being so aligned, the force exerted by spring member 102 will expand into a second compressed configuration and force, or bias, spacer ring 103" against the gate valve body 53 and force, or bias, the seat 101" into sealing engagement against the valve gate 51, as shown in FIG. 28.

Of course, other releasable locking members and/or mechanisms could be utilized to allow wave spring 102 to be first compressed and retained in a first compressed configuration, and upon its release or removal, permits the spring to expand into a second compressed configuration.

The valve seats 100, 100' and 100" permit the gate 51 to be readily installed in gate valve 50, whether by field service personnel in the field or factory assembly personnel, without damaging the gate 51 or the seats 100, 100', and 100".

Specific embodiments of the present gate valve seat have been described and illustrated. It will be understood to those skilled in the art that changes and modifications may be made without departing from the spirit and scope of the invention to be defined by the appended claims.

I claim:

1. A method for installing a gate valve seat in a gate valve having a gate comprising:
   utilizing a gate valve seat having a stepped outer wall surface, a spring, a spacer ring, and a releasable locking mechanism associated with the spacer ring;
   releasably locking the spacer ring to the seat and compressing the spring into a, first compressed configuration;
   installing the seat, spring, spacer ring, and releasable locking mechanism into the gate valve;
   releasing the releasable locking mechanism to permit the spring to expand into a second compressed configuration to bias the seat against the gate.

2. The method of claim 1, including forming the stepped outer wall surface of the seat by providing a plurality of concentric circumferential outer wall surfaces having different diameters.

3. The method of claim 1, including utilizing a wave spring as the spring.

4. The method of claim 1, including utilizing a screw to initially releasably secure the spacer ring to the seat.

5. The method of claim 1, including associating at least two alignment members with the stepped outer wall surface of the seat;

providing an internal circumferential groove in the spacer ring;

providing at least two alignment member access openings in the spacer ring for receipt of the at least two alignment members into the internal circumferential groove;

inserting the at least two alignment members into the at least two alignment member access openings and into the internal circumferential groove;

rotating the spacer ring, to releasably lock the spacer ring to the seat with the spring disposed in its first compressed configuration; and rotating the spacer ring to place the at least two alignment members in alignment with the at least two alignment member access openings, to unlock the spacer ring from the seat to expand the spring into its second compressed configuration.

6. The method of claim 5, including providing the stepped outer wall surface of the seat with a first opening and providing the outer wall surface of the spacer ring with a second opening, and inserting a tool into each of the first and second openings to rotate the spacer ring with respect to the seat.

7. A gate valve seat for use in a gate valve having a gate and a gate valve body, comprising:
    a seat having a stepped outer wall surface;
    an annular shaped spring;
    an annular shaped spacer ring;
    an annular shaped front facing lip seal adapted for sealing against a portion of the gate valve body;
    an annular shaped rear facing lip seal, which seals against a first portion of the stepped outer wall surface of the seat;
    the spring, spacer ring, front facing lip seal, and rear facing lip seal are disposed about the stepped outer wall surface of the seat, with the spring being disposed in a compressed configuration between a second portion of the stepped outer wall surface of the seat and the spacer ring, whereby the spring biases the seat toward the gate of the gate valve; and
    wherein the spacer ring includes a releasable locking mechanism to initially compress the spring in a first compressed configuration with respect to the seat and the spacer ring, and upon release of releasable member, the spring expands into a second compressed configuration.

8. The gate valve seat of claim 7, wherein the seat is a generally elongate tubular member and the stepped outer wall surface of the seat is formed by a plurality of concentric circumferential outer wall surfaces having different diameters.

9. The gate valve seat of claim 7, wherein the spring is a wave spring.

10. The gate valve seat of claim 7, wherein the releasable locking mechanism is a screw which initially releasably secures the spacer ring to the seat.

11. The gate valve seat of claim 7, wherein the releasable locking mechanism includes:
    at least two alignment members associated with the stepped outer wall surface of the seat;
    an internal circumferential groove in the spacer ring;
    at least two alignment member access openings in the spacer ring for receipt of the at least two alignment members into the internal circumferential groove, whereby upon insertion of the at least two alignment members into the at least two alignment member access openings and into the internal circumferential groove, and further upon rotation of the spacer ring, the spacer ring is releasably locked to the seat with the spring disposed in its first compressed configuration and upon rotation of the spacer ring to place the at least two alignment members in alignment with the at least two alignment member access openings, the spacer ring may be unlocked from the seat and the spring expands into its second compressed configuration.

12. The gate valve seat of claim 11, wherein the at least two alignment members are cap screws.

13. The gate valve seat of claim 11, wherein the stepped outer wall surface of the seat includes a first opening and the outer wall surface of the spacer ring includes a second opening, the first and second openings each being adapted to receive a tool to rotate the spacer ring with respect to the seat.

* * * * *